United States Patent
Sullivan

[15] 3,657,942
[45] Apr. 25, 1972

[54] CONTROL CABLE
[72] Inventor: Matthew A. Sullivan, c/o Sullivan Products Inc., 535 Davisville Road, Willow Grove, Pa. 19090
[22] Filed: June 9, 1970
[21] Appl. No.: 44,826

[52] U.S. Cl. ................................................74/501, 3/12.1
[51] Int. Cl. .............................................................F16c 1/10
[58] Field of Search ...................74/501, 501 P, 502; 3/12.1, 3/12.8; 138/128

[56] References Cited

UNITED STATES PATENTS

| 3,257,863 | 6/1966 | Hanson | 74/501 |
| 3,240,233 | 3/1966 | Johnston | 74/501 X |
| 1,559,306 | 10/1925 | Berkman | 74/502 |
| 3,302,479 | 2/1967 | Conrad | 74/501 |
| 3,389,579 | 6/1968 | Werner | 74/501 X |
| 3,434,501 | 3/1969 | Conrad | 74/501 X |

FOREIGN PATENTS OR APPLICATIONS 564,832 10/1923 France .................................74/501 P Primary Examiner—William F. O'Dea
Assistant Examiner—F. D. Shoemaker
Attorney—Seidel, Gonda & Goldhammer

[57] ABSTRACT

A control cable of the Bowden type comprised of plastic components that are provided with friction reducing means on their interface to reduce friction between the components of the cable and to eliminate jamming of the cable by oil and dust.

5 Claims, 4 Drawing Figures

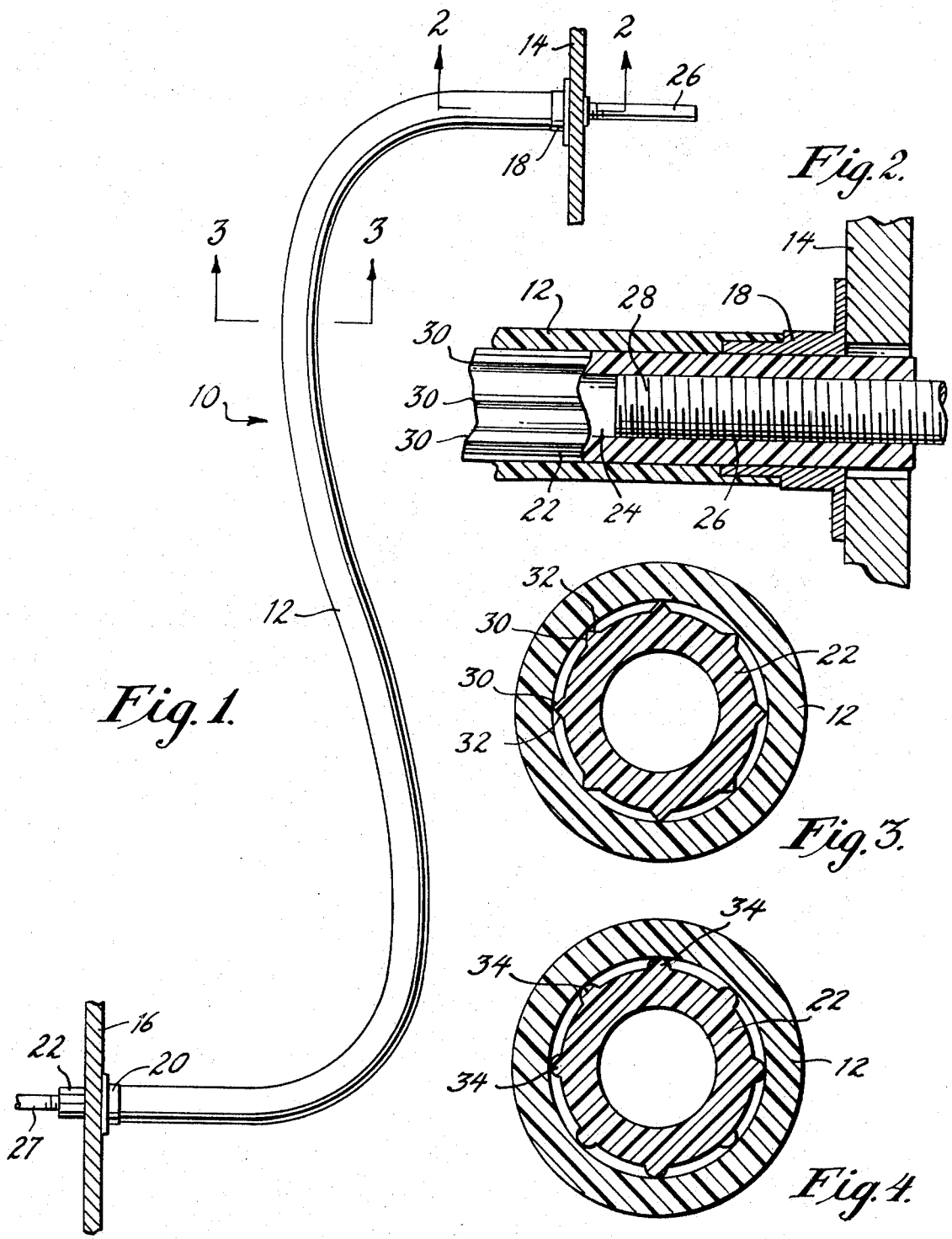

CONTROL CABLE

This invention relates to control cables and more particularly to a cable of the Bowden type.

Bowden cables are well known as devices for transmitting motion or force through what may be a tortuous or non-linear path. The cables generally comprise an outer hollow elongated flexible housing which is usually anchored at one end to the desired source of input and at its other end to the place where the output is desired. An elongated flexible thin rod is inserted in and guided by the outer housing. One end of the rod is connected to the object which is to be controlled and the other end is connected to a source of input.

Since the cable is comprised of relatively flexible members, it can easily be placed over curved and twisted paths, and thus can be placed in any convenient path without necessarily lying in a straight line.

Bowden cables of the type described above have many widespread and well known applications. Perhaps the most common of these is the manual choke on an automobile. In this function, one end of the cable is connected to the dashboard of the vehicle while the other end is connected to the choke control.

These cables are virtually trouble-free. However, they are only effective over relatively short length. This is because when cables of substantial length are utilized, friction between the inner and outer members required excessive effort to move the inner member. Additionally, because the cable comprises essentially a hollow elongated outer member, there is opportunity for oil and dust to collect therein. These substances contribute to the frictional problem and thus should be avoided.

Additionally, Bowden cables known heretofore have been of relatively loose tolerance. This is because there had to be a substantial difference between the outside diameter of the movable rod and the inside diameter of the fixed housing. If the two diameters were substantially the same, thereby providing a close fit, the friction generated thereby could effectively preclude the device from operating. Accurate settings with Bowden cables known heretofore were virtually impossible. Thus, constant monitoring of the output of the cable was necessary in order to determine if the input should be varied in response thereto.

Accordingly, it is an object of this invention to provide a control cable of the Bowden type which obviates the disadvantages of like cables known heretofore.

It is another object of this invention to provide a cable of Bowden type having portions thereof in close fitting relation.

It is another object of this invention to provide a cable of the Bowden type wherein the effects of friction on the parts thereof are substantially reduced.

It is another object of this invention to provide a cable of the Bowden type wherein interference caused by oil and dust is substantially eliminated.

It is still another object of this invention to provide a cable of the Bowden type that is relatively lightweight.

Generally, the invention relates to a device for transmitting movement comprising a first elongated, hollow flexible member, a second elongated, flexible member, said second member being slidingly received in said first member to permit relative axial and rotary movement therebetween, and means on the interface between said first and second elongated members for simultaneously contacting said members to substantially reduce lost motion and friction therebetween.

Other objects and advantages of the subject invention will be apparent from a detailed description thereof which follows. For the purpose of illustrating the invention, there is shown in the drawings a form which is presently preferred; it being understood, however, that this invention is not limited to the precise arrangements and instrumentalities shown.

FIG. 1 is a side elevation view of a device constructed in accordance with a preferred form of the invention.

FIG. 2 is a sectional view taken along line 2—2 of FIG. 1.

FIG. 3 is a sectional view taken along line 3—3 of FIG. 1.

FIG. 4 is a view similar to that shown in FIG. 3 but of a modification thereof.

Referring now to the drawing for a detailed description of the invention, a cable 10 of the Bowden type constructed in accordance with a preferred form of the invention is illustrated.

The cable comprises an outer, hollow member 12 which may be comprised of a flexible, lightweight material such as a yieldable plastic or the like. Preferably, such a material is capable of being bent into curves of rather small diameter without substantially reducing the cross section of the opening therein. The cable is shown in an exemplary fashion to be in the form of an S-curve with the upper portion thereof being connected to a first panel 14 and the lower portion hereof being connected to a second panel 16.

The cable 10 may be connected to the panels by any suitable means that permits relative sliding movement of the inner member as will be more fully explained herein. By way of example, and not by way of limitation, the outer member is shown to be connected to the panels by end fittings 18 and 20 which are connected to the ends of outer hollow member 12 at its ends. Each of the fittings 18 and 20 may be provided with radially extended flanges which may be fastened to the panels 14 and 16 by suitable fastening means.

The outer hollow member 12 which is anchored at both ends serves as a conduit or guide for an inner flexible member 22. Member 22 is preferably formed of a suitable lightweight, non-stretch plastic material. However, it is to be understood that any suitable material such as a flexible rod or the like can be employed. The principal requirement for such a member is that it be capable of being bent into the path that the outer hollow member is bent and that it be capable of applying both push and pull loads where it is subject to compressive or tensile loads.

As illustrated in the drawing a preferred embodiment of the inner flexible member is a tube having a central aperture 24. While the aperture 24 is shown to extend the entire length of the tube, it will be apparent from what follows hereafter that the tube need only have such apertures at its ends and may be of solid cross-section throughout the remainder of its length.

A suitable device for connecting the inner flexible member 22 at its ends to input and output devices may be provided. Advantageously, such a device is separate from member 22 and is connected thereto. Such a device is illustrated in FIG. 2. Therein, it can be seen that suitable connection member 26 which corresponds to another member 27 at the other end of the inner flexible member 22 is a relatively short rod having a threaded end 28 which is threadingly received in the aperture 24 at the end of member 22. While a threaded connection between the rod and the inner flexible member is shown, it is apparent that other alternative means of achieving this connection can be utilized. One such alternative would be by bonding the rod to member 22. Rod 26 is relatively rigid and thus provides a suitable member for coupling the cable.

Means are provided for enabling the outer and inner members to fit together with relatively close tolerance and at the same time minimizing the effects of oil, dust, or friction. Such means comprise elongated, circumferentially spaced ribs 30. While these ribs are illustrated, by way of example as being on the exterior of the inner flexible member and being directed outwardly, it is apparent that they may also function in a full equivalent sense by being on the interior of the outer flexible member and being directed inwardly. By being in spaced circumferential relationship to each other, they provide a minimum of contact points on the interface between the two members while at the same time closely confining them so that lost motion between the two members is substantially reduced. Again, by virtue of the rib arrangement the effects of dust and oil are substantially reduced. Finally, because of the point contact, frictional forces are also substantially reduced. A number of alternative configurations for the ribs can be utilized, however, in a preferred form thereof, they have a triangular cross-section 32 as shown in FIG. 3. Such a cross-section provides a relatively strong base for each of the ribs while its apex provides a point contact at the interface.

Alternative configurations are square (not illustrated) and rounded cross-sections 34 (illustrated in FIG. 4). These embodiments, while not preserving the point contact that is achieved with the triangle, present a stronger rib that is less likely to deflect under loads.

Such a device as described heretofore is operated simply by applying a push or pull force on either rod 26 or 27. This results in the movement of the inner flexible member 22 inside the housing and a corresponding inward or outward movement of the rod 26 or 27 at the other end thereof. The arrangement of the ribs providing contact along the interface between the inner and outer members comprising the cable, permit cables of relatively long lengths to be utilized since the frictional force resisting relative movement of the two members will be substantially reduced. In the alternative, such cables have widespread application in environments where automatic control systems using relatively small, low powered motors are present. In this environment, the fact that friction is substantially reduced reduces the power requirements for such motors and thus promotes simpler and less costly designs. By way of example, such an environment is present in model airplanes where weight is a critical factor and thus positive control elements such as the cable described herein that require relatively little power to drive them are to be desired. In one presently preferred form of the control cable the outside diameter of the inner flexible housing is approximately 0.125 inches and each of the ribs is 0.005 inches high and 0.010 inches wide and the outside diameter of the outer member is less than 0.2 inch.

The present invention may be embodied in other specific forms without departing from the spirit or essential attributes thereof and, accordingly, reference should be made to the appended claims, rather than to the foregoing specification as indicating the scope of the invention.

I claim:

1. In a device of the type for transmitting movement comprising a first elongated, hollow, flexible member and a second elongated, flexible member slideably received therein for axial and rotational movement relative thereto, the improvement comprising, a plurality of longitudinally extending ribs supported on one of said elongated flexible members in spaced circumferential relation to each other, said ribs being disposed on the interface between said first and second members and in close fitting, sliding relation to said other member along their length so as to reduce lost motion therebetween, said second member being hollow throughout its length, a rigid rod supported at each end of said second member, said rods having threaded ends, and said ends are threadingly received in said second elongated member.

2. A device as defined in claim 1 wherein at least some of said ribs have side walls that converge to a point, and said points are in sliding contact with said other member.

3. A device as defined in claim 2 wherein said ribs are supported by said inner elongated member.

4. A device as defined in claim 1 wherein at least some of said ribs are rounded in cross section and a portion of the surface of said ribs are in sliding contact with said other member.

5. A device as defined in claim 1 wherein at least some of said ribs are square in cross-section and a portion of the surface of said ribs are in sliding contact with said other member.

* * * * *